June 16, 1931.                A. A. THOMAS                1,810,502

AUTOMOBILE BUMPER

Filed June 19, 1930

INVENTOR

Adolph A. Thomas

Patented June 16, 1931

1,810,502

UNITED STATES PATENT OFFICE

ADOLPH A. THOMAS, OF NEW YORK, N. Y.

AUTOMOBILE BUMPER

Application filed June 19, 1930. Serial No. 462,162.

My new invention is for an automobile bumper adapted to absorb the shock of a collision by expanding a spring or other elastic member arranged transversely of the car. This spring is connected at its ends to a pair of slidable blocks which support a bumper bar. This chassis of the car carries a pair of pivoted diverging links which act like a toggle and are connected at their outer ends to the slidable blocks. When the bumper bar strikes an obstruction, the toggle links tend to straighten and force the slidable blocks apart, so that the spring is expanded and absorbs the shock of the impact. I employ a single long spring or rubber bar which is free to expand crosswise of the car and is thus capable of neutralizing a powerful head-on force.

The novel features and practical advantages of my invention will be understood from a description of the accompanying drawings, in which—

Figure 3:
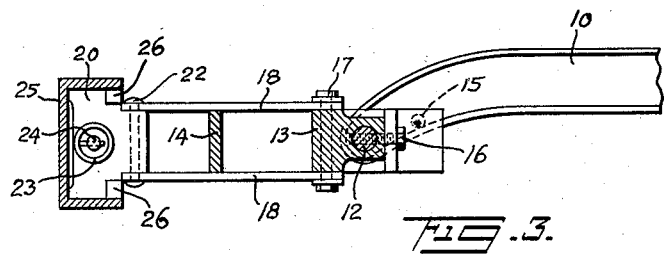
Fig. 3 represents a section line 3—3 of Fig. 1, on a slightly larger scale for clearness.

The chassis extensions 10 of an automobile carry a cross-bar 12 on which a supporting block 13 is rigidly mounted at or near the center. A bracket 14 is secured to extensions 10 by bolts 15 and to block 13 by bolts 16, which may also pass through cross-bar 12, as shown in Fig. 3. The bracket 14 is bent into substantially rectangular shape from a single strip of sheet metal.

Figure 4:
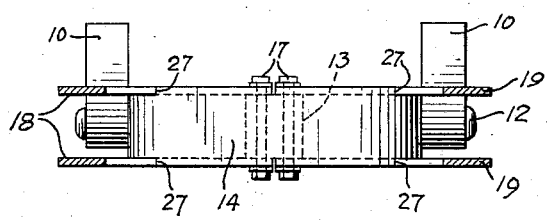
Fig. 4 is a section on line 4—4 of Fig. 1.

The supporting block 13 carries a pair of vertical bolts or pins 17 on which two toggle links 18 and 19 are pivoted at their inner ends. In the present embodiment, each link 18 and 19 consists of two flat bars extending above and below the fixed bracket 14, as best shown in Figs. 3 and 4. For convenience I shall refer to each pair of bars 18 and 19 as a link, particularly since only one bar may be used for each link.

The links 18 and 19 diverge outwardly at a rather wide angle, and the outer ends of the links are connected to a pair of blocks 20 and 21 by bolts or pivot pins 22. An elastic element 23 arranged transversely of the car is connected at its ends to blocks 20 and 21. In the present instance the elastic element 23 is shown as a contracting coil spring attached to bolts or lugs 24 carried by blocks 20 and 21. In place of a coil spring I may use a bar of india rubber or other elastic member adapted to stretch when the blocks 20 and 21 are moved apart.

A bumper bar 25 is supported by the slidable blocks 20 and 21. It is convenient to make the bumper bar 25 from a single piece of heavy sheet metal of channel-shaped cross-section. The blocks 20 and 21 are rectangular and fit snugly into the channel-shaped bumper bar. Ribs 26 attached to the upper and lower flanges of the bumper bar engage the slidable blocks and thereby lock them to the bar without interfering with the slidable movements of the blocks. The ribs 26 may be strips of metal welded to the flanges of the bumper bar, or they may be formed as integral projections of the bar.

The bracket 14 cooperates with pivot pins 17 to support the links 18 and 19 for horizontal movement. The bars comprising each link are so spaced as to engage the top and bottom edges of bracket 14, whereby the latter prevents vertical or tilting movement of the links. The bracket 14 is provided with shoulders 27 against which the links are normally held by the contracting action of spring 23. In other words, the shoulders 27 act as stops to limit the inward movement of links 18 and 19, so that the elastic member 23 is normally under predetermined tension. By making the connecting members 24 axially adjustable, as by ordinary screw-threaded means, the normal tension of elastic member 23 may be regulated, but this detail is not to be believed to be necessary. Since the tensioned spring 23 normally tends to rock the pivoted blocks 20 and 21 toward each other, these blocks are firmly held between the ribs 26 and the front side of bumper bar 25. In this way, all play or looseness between the bumper bar and the slidable blocks is eliminated and rattling of the parts is impossible. In other words, the parts normally constitute a rigid structure.

When the bumper bar 25 strikes an obstruction, the blocks 20 and 21 are forced apart and stretch the elastic member 23 until the acting force is neutralized. That is to say, the direct force of an impact is translated in a direction at right angles to the longitudinal axis of the car and spends itself in expanding the elastic element 23. Consequently, the car and its occupants do not feel the sudden jolt of a collision. Attention is called to the great length of spring 23, which is thus capable of absorbing unusually heavy shocks. By comparing Figs. 1 and 2, it will be seen that the elastic element 23 can expand more than ten percent of its normal length, and Fig. 2 is not supposed to show the limit to which the elastic element can be stretched. The use of a long spring or other elastic element and its freedom to expand constitute an important feature of my invention.

Figure 1:
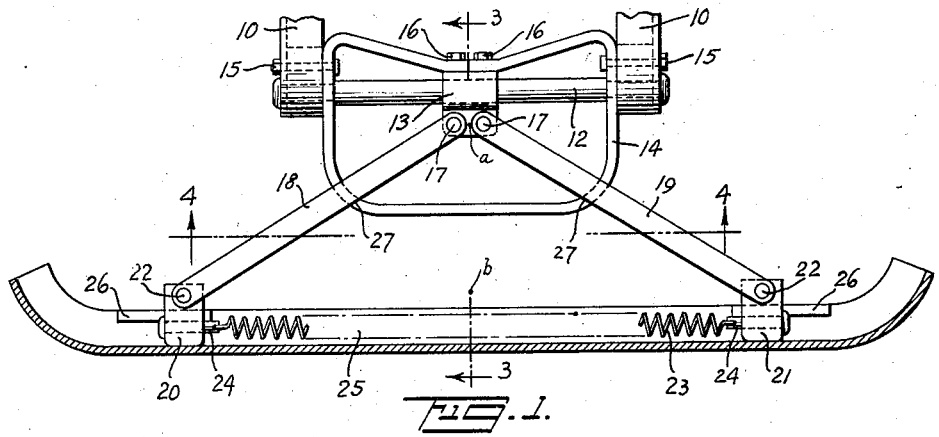
Fig. 1 shows in plan view, partly sectioned, a preferred form of my bumper attached to the front end of an automobile, the movable parts being in normal position.
Figure 2:
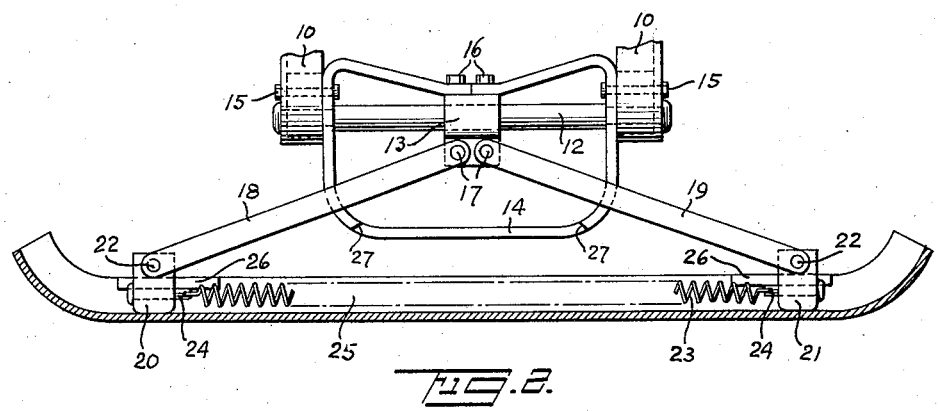
Fig. 2 is a view similar to Fig. 1 with the movable parts of the bumper structure in position when the bumper bar strikes an obstruction.

Referring to Fig. 1, it will be seen that the normal distance between the pivot points 22 of blocks 20 and 21 is more than three times greater than the length of an imaginary line $a$—$b$, which may be considered as the altitude of a triangle formed by the diverging links 18—19. This arrangement enables me to use a spring more than half the length of bumper bar 25. I mention these measurements by way of illustration and not as an indispensable limitation of my invention. By choosing a spring or rubber bar of proper strength, it is possible to save a car and its occupants from serious injury even when the car collides at great speed. It should be noted that the spring 23 is connected to the toggle links 18—19 at points of maximum lateral movement for a given inward movement of bumper bar 25, whereby the spring operates at highest efficiency.

The obtuse angle at which the toggle links 18 and 19 normally diverge not only permits the use of a long spring, but also prevents the bumper bar 25 from projecting too far from the chassis extensions 10. In other words, my shock-absorbing bumper structure need not project from the car to a greater distance than the old type of bumper heretofore used. In some cases the links 18 and 19 may have to be curved to avoid striking the mudguards of the car. The structure as a whole comprises only a few rugged parts which are cheap to make and easy to assemble. Furthermore, the bumper can be attached to any make or style of automobile. The concealment of blocks 20—21 and spring 23 behind the bumper car enhances the good looks of the entire structure.

When in some claims I speak of a single elastic element connected to the slidable blocks 20—21, I do not necessarily mean that only one spring or like member must be used, for it is manifestly possible to connect two or more springs of equal length to the blocks in parallel arrangement. What I mean is that at least one spring of effective length connects the slidable blocks, as distinguished from a plurality of short springs operable independently of each other. Also a single long spring may consist of several shorter springs connected end to end in series but free to operate as one spring. I mention these possible variations as coming within the scope of my invention.

Although I have shown and described a certain specific construction, I want it understood that my invention is not limited to the details set forth. Changes and modifications will probably occur to others without departing from the scope of the invention as defined in the appended claims.

I claim as my invention:

1. An automobile bumper structure comprising a bumper bar, a pair of blocks slidably connected to said bar, an elastic element connected to said blocks and free to expand when the blocks are moved apart, and means for so supporting said blocks that they are forced apart when the bumper bar strikes an obstruction, the normal length of said elastic element being at least one-half the length of said bar.

2. An automobile bumper structure comprising a pair of slidable blocks, a single elastic element connecting said blocks and adapted to be tensioned when said blocks are moved apart, a bumper bar mounted on said blocks in slidable engagement therewith, the normal length of said elastic element being not less than half the length of said bar, and a pair of pivoted links supporting said blocks for slidable movement, said blocks being free to slide apart and expand said element when said bar strikes an obstruction.

3. An automobile having a pair of chassis extensions connected by a cross-bar, a supporting member fixed to said cross-bar, a pair of links pivoted to said member and diverging outwardly, a pair of blocks pivotally connected to the outer ends of said links, an expansible elastic element attached at its ends to said blocks, and a bumper bar carried by said blocks which are in slidable engagement with said bar, whereby said bar when it strikes an obstruction forces said blocks apart and expands said elastic element.

4. An automobile having a pair of chassis extensions connected by a cross-bar, a pair of links pivotally supported on the central portion of said cross-bar and diverging outwardly beyond said extensions, a pair of blocks pivotally connected to the outer ends of said links, an expansible elastic element attached at its ends to said blocks, and a bumper bar carried by said blocks which are in slidable engagement with said bar, whereby said bar when it strikes an obstruction forces said blocks apart and expands said elastic element.

5. An automobile bumper structure comprising a pair of links pivoted at their inner ends between two chassis extensions of a car and diverging outwardly, a pair of blocks connected to the outer ends of said links, a single elastic element connected to said blocks and free to be expanded, said elastic element being normally of greater length than the distance between said chassis extensions, and a bumper bar carried by said blocks which are in slidable engagement with said bar, whereby said bar when it strikes an obstruction forces said blocks apart and expands said elastic element.

6. An automobile bumper structure comprising a pair of links pivoted at their inner ends between two chassis extensions of a car and diverging outwardly, a pair of blocks connected to the outer ends of said links, a single contractile coil spring connected at its ends to said blocks and normally of greater length than the distance between said chassis extensions, and a bumper bar carried by said blocks which are in slidable engagement with said bar, whereby said bar when it strikes an obstruction forces said blocks apart and expands said elastic spring.

7. An automobile bumper structure comprising a pair of links pivoted at their inner ends between two chassis extensions of a car and diverging outwardly, a pair of blocks connected to the outer ends of said links, a single elastic element connected at its ends to said blocks and free to be expanded, a bumper bar carried by said blocks which are in slidable engagement with said bar, whereby said bar when it strikes an obstruction forces said blocks apart and expands said elastic element, and stops carried by said chassis extensions and arranged to engage said links to limit the inward movement of the latter under the contracting action of said element.

8. An automobile having a pair of chassis extensions connected by a cross-bar, a supporting member fixed to said cross-bar, a pair of links pivoted to said member and diverging outwardly, a pair of blocks pivotally connected to the outer ends of said links, an expansible elastic element attached at its ends to said blocks, a bumper bar carried by said blocks which are in slidable engagement with said bar, whereby said bar when it strikes an obstruction forces said blocks apart and expands said elastic element, and a bracket secured to said chassis extensions for engaging said links and limiting their inward movement against the contracting action of said elastic element.

9. An automobile bumper structure comprising a pair of links pivoted at their inner ends to the chassis of a car and diverging outwardly, a pair of blocks connected to the outer ends of said links, an elastic element connected at its ends to said blocks and adapted to expand when said blocks are moved apart, a bumper bar carried by said blocks which are moved apart when the car strikes an obstruction, a bracket secured to the chassis and engaging said links at a distance from their inner pivots to prevent tilting or vertical movement of the links and guide them in their horizontal movements, and means to limit the inward movement of said links against the contracting action of said elastic element.

10. An automobile having a pair of chassis extensions connected by a cross-bar, a supporting member fixed to said cross-bar, a pair of links pivoted to said member and diverging outwardly, a pair of blocks pivotally connected to the outer ends of said links, an expansible elastic element attached at its ends to said blocks, a bumper bar carried by said blocks which are in slidable engagement with said bar, whereby said bar when it strikes an obstruction forces said blocks apart and expands said elastic element, and a substantially rectangular bracket secured to said chassis extensions and to said member for engaging said links and limiting their inward movement against the contracting action of said elastic element.

11. An automobile bumper structure comprising a bumper bar channel-shaped in cross-section and open at the rear, a pair of ribs secured to the upper and lower flanges of said bar near each end, a pair of blocks slidably attached to said bar, each block engaging a pair of said ribs which lock the bar to the blocks and permit slidable movement of the latter, an elastic element connected at its ends to said blocks and adapted to expand when the blocks are moved apart, said elastic element being arranged within the channel space of said bar, pivoted members carried by the chassis of the car for supporting said blocks, and means for limiting the movement of said blocks toward each other against the contracting action of said element.

12. An automobile bumper structure comprising a pair of links pivoted at their inner ends to the chassis of a car and diverging outwardly, a pair of blocks pivotally connected to the outer ends of said links, an elastic element connected at its ends to said blocks and free to expand when the blocks are moved apart, said elastic element normally tending to contract, means for limiting the inward movement of said links against the contracting action of said element, the normal distance between the pivotal connections of said blocks being at least three times greater than the distance the inner pivots of said links and a line joining and pivotal connections of the blocks, and a bumper bar carried by said slidable blocks and adapted to force the latter apart when the bar strikes an obstruction.

13. An automobile having a pair of chassis extensions connected by a cross bar, a block mounted on said bar, a horizontal bracket carried by said extensions and projecting forwardly of said bar, and a bumper structure conjointly supported by said block and bracket.

14. An automobile having a pair of chassis extensions connected by a cross bar, a block mounted on said bar, a horizontal bracket carried by said extensions and projecting forwardly of said bar, and a bumper structure conjointly supported by said block and bracket, said bumper structure including movable links connected to said block and engaging said bracket.

15. An automobile bumper structure comprising horizontal links pivoted to the car and diverging outwardly, a bracket fixed to the car and engaging said links to prevent vertical movement thereof, an expansible elastic element connecting the outer ends of said links, means on said bracket to limit the inward movement of said links against the contracting action of said element, and an impact member adapted to force said links apart and thereby expand said element.

ADOLPH A. THOMAS.